US007649580B2

United States Patent
Su

(10) Patent No.: US 7,649,580 B2
(45) Date of Patent: Jan. 19, 2010

(54) LIQUID CRYSTAL DISPLAY PANEL AND REPAIRING METHOD THEREOF

(75) Inventor: Ting-Hui Su, Tai-Nan (TW)

(73) Assignee: HannStar Display Corp., Yang-Mei, Tao-Yuan Hsien (TW)

( * ) Notice: Subject to any disclaimer, the term of this patent is extended or adjusted under 35 U.S.C. 154(b) by 416 days.

(21) Appl. No.: 11/622,452

(22) Filed: Jan. 11, 2007

(65) Prior Publication Data

US 2008/0170167 A1 Jul. 17, 2008

(51) Int. Cl.
G02F 1/1333 (2006.01)
G02F 1/13 (2006.01)
(52) U.S. Cl. .................................. 349/38; 349/192
(58) Field of Classification Search .................. 349/38, 349/192, 139, 143, 43, 138
See application file for complete search history.

(56) References Cited

U.S. PATENT DOCUMENTS 5,995,178 A  11/1999 Fujikawa et al.
6,992,747 B2  1/2006 Chen
7,023,035 B2  4/2006 Lai
7,034,903 B2  4/2006 Lee
7,221,413 B2 *  5/2007 Lai .............................. 349/38
2005/0116915 A1  6/2005 Nakajima et al.
2005/0253144 A1  11/2005 Lai
2005/0253145 A1  11/2005 Lai
2006/0028592 A1  2/2006 Lai
2006/0092341 A1  5/2006 Huang et al.

* cited by examiner

Primary Examiner—Thoi V Duong
(74) Attorney, Agent, or Firm—Winston Hsu

(57) ABSTRACT

A method of repairing a defect in a liquid crystal display panel is provided. The method comprises: providing an array substrate, a plurality of pixel regions over the array substrate, and at least one of the pixel regions comprising a transistor, a pixel electrode, a storage capacitor having an upper electrode and a bottom electrode, a defect positioned in the storage capacitor; performing a cutting process to divide the pixel electrode into a first portion and a second portion not connecting to each other, wherein said first portion of said pixel electrode is corresponding to the storage capacitor having said defect; and electrically connecting the second portion of the pixel electrode to one of the scan lines.

34 Claims, 12 Drawing Sheets

LIQUID CRYSTAL DISPLAY PANEL AND REPAIRING METHOD THEREOF

BACKGROUND OF THE INVENTION

1. Field of the Invention

The present invention relates to a liquid crystal display panel and repairing method thereof, and more particularly, to a method able to repair bright dot defect or other pixel defect problem in an array substrate of a liquid crystal display panel.

2. Description of the Prior Art

A conventional liquid crystal display (LCD) panel normally includes a thin film transistor array substrate (array substrate), a color filter substrate (CF substrate) having a common electrode thereon disposed over the array substrate, and a liquid crystal layer interposed there between. Please refer to FIGS. 1-2. FIGS. 1-2 are schematic diagrams illustrating an array substrate of a conventional LCD panel, where FIG. 1 is a top view of a portion of the array substrate, and FIG. 2 is a cross-sectional view of the array substrate shown in FIG. 1 along the line PP'. As shown in FIG. 1-2, the conventional array substrate 10 includes a plurality of scan lines 12, a plurality of data lines 14, a plurality of pixel regions 16 defined by the scan lines 12 and the data lines 14, and a plurality of common lines 20 arranged in alternately with the scan lines 12. Each pixel region 16 has at least a thin film transistor 18 and a pixel electrode 22 corresponding to the thin film transistor 18. The pixel electrode 22 is disposed facing the common electrode of the CF substrate (not shown), in which the liquid crystal is interposed between the pixel electrode 22 and the common electrode. In addition, the overlapping region of the pixel electrode 22 and the common line 20 form a storage capacitor on common line (Cst on common). Each thin film transistor 18 serves as a switch in each pixel region 16. In the displaying operation, the common electrode of the CF substrate is usually receiving a common voltage. Following, a particular pixel region is selected through a corresponding scan line 12 receiving a scan signal and then the pixel electrode 22 of the pixel region 16 is written into a pixel voltage via a corresponding data line 14 receiving a data signal. Sequentially, the voltage difference between the pixel electrode 16 and common electrode makes the liquid crystal rotate to a predetermined direction to control the illumination out from the CF substrate and then a display is achieved.

The storage capacitor assists the pixel region 16 to operate normally, however, any processing defects or particles occurring in the storage capacitor may lead to malfunction of the storage capacitor. For instance, if a particle 24 unexpectedly falls into the storage capacitor region, the particle 24 may lead to a short-circuitry between the pixel electrode 22 and the common line 20. In such a case, the voltage of the pixel electrode 22 will be identical to the voltage of the common line 20. Since the common line 20 and the common electrode of the CF substrate usually have the same voltage, the voltage of the pixel electrode 22 and the voltage of the common electrode of the CF substrate will be identical. This fails the pixel region 16. Furthermore, if the LCD is a normally white (NW) type LCD, back light will pass through the liquid crystal layer and cause a bright dot defect because no voltage difference exists between the pixel electrode 22 and the common electrode. In addition to the particles, other defects such as a dielectric layer loss or a common line loss that makes the pixel electrode 22 and the common line 20 short-circuited will also cause the bright dot defect in an NW type LCD.

Accordingly, there is a need to provide a simply and effective repairing method of the pixel to solve the display problems due to particles or other defects.

SUMMARY OF THE INVENTION

It is an objective of the present invention to provide a liquid crystal display and repairing method thereof to solve the bright dot defect and other pixel defect problem.

It is another objective of the present invention to provide a liquid crystal display and repairing method which is easy to be implemented in the manufacture process.

According to an embodiment of the present invention, a method of repairing a defect in a liquid crystal display panel is provided. The method comprises: providing an array substrate comprising a plurality of scan lines and data lines disposed over the array substrate and together defining a plurality of pixel regions, and at least one of the pixel regions comprising a transistor, a pixel electrode electrically connected to a source/drain electrode of the transistor, a storage capacitor having an upper electrode and a bottom electrode, wherein the pixel electrode is electrically coupled to the storage capacitor, and there is a defect positioned in the storage capacitor; subsequently, performing a cutting process to divide the pixel electrode into a first portion and a second portion not connecting to each other, wherein the first portion of the pixel electrode is corresponding to the storage capacitor having the defect; and then electrically connecting the second portion of the pixel electrode to one of the scan lines.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
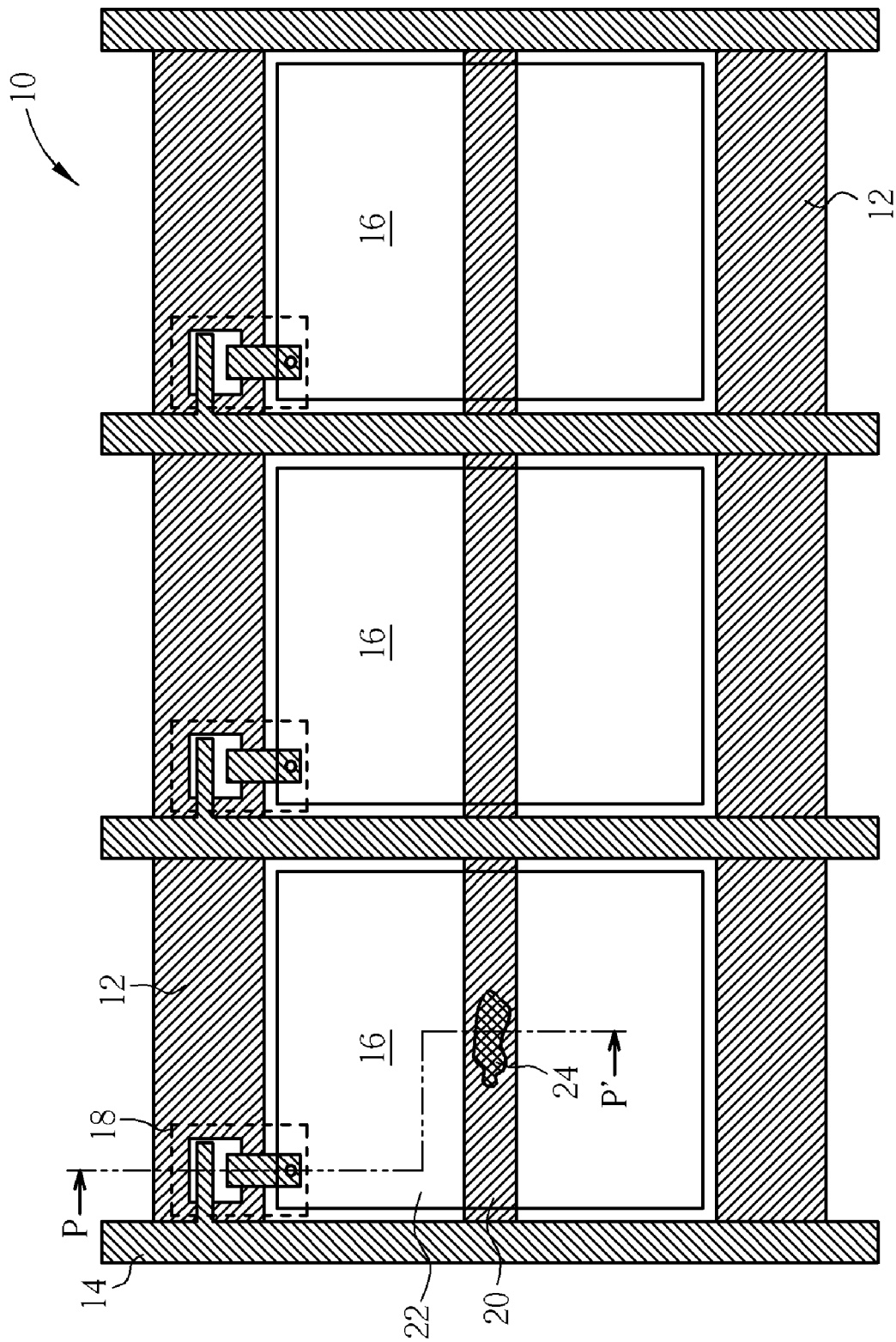
FIGS. 1-2 are schematic diagrams illustrating a conventional array substrate.
Figure 2:
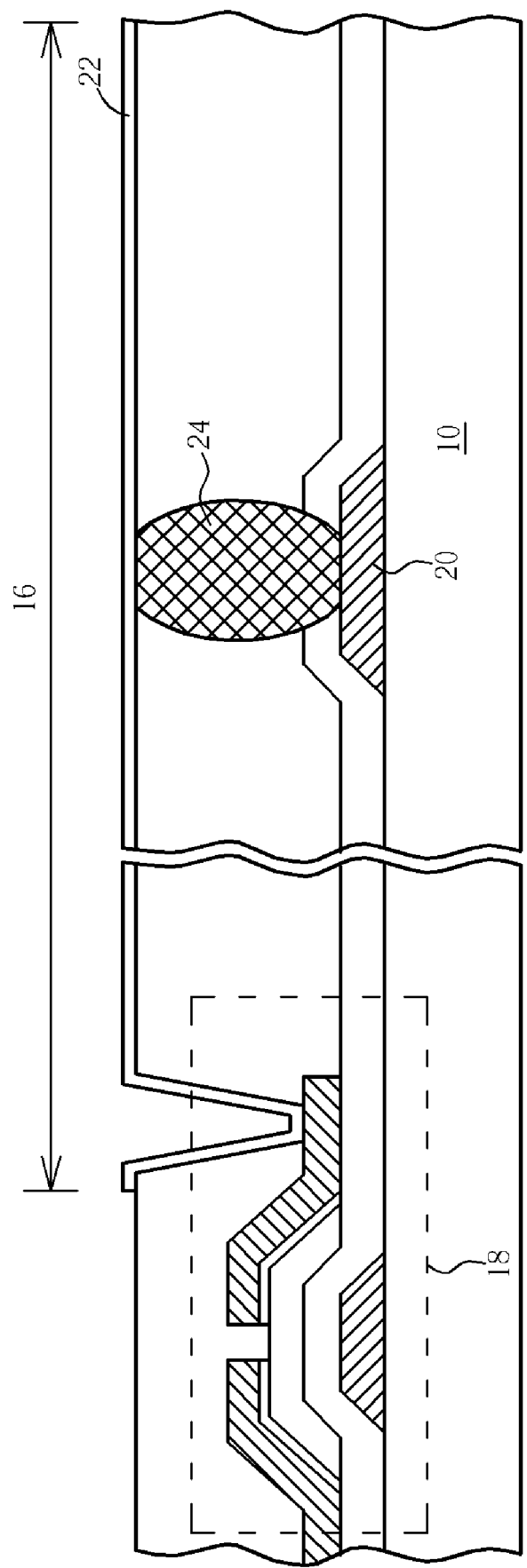
Figure 3:
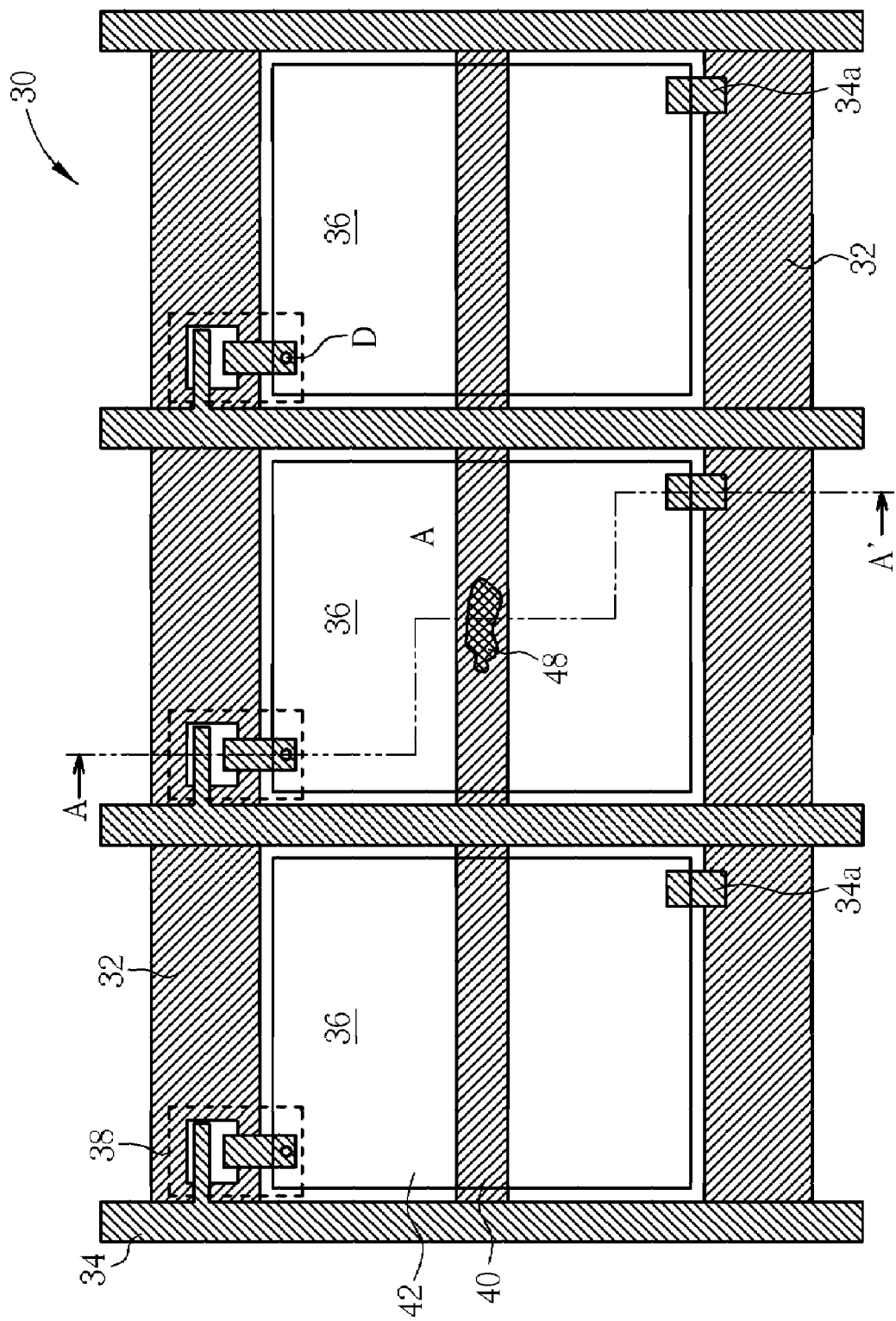
FIGS. 3-8 are schematic diagrams illustrating a method of repairing a defect in an array substrate of an LCD panel in accordance with the first embodiment of the present invention.
Figure 4A:
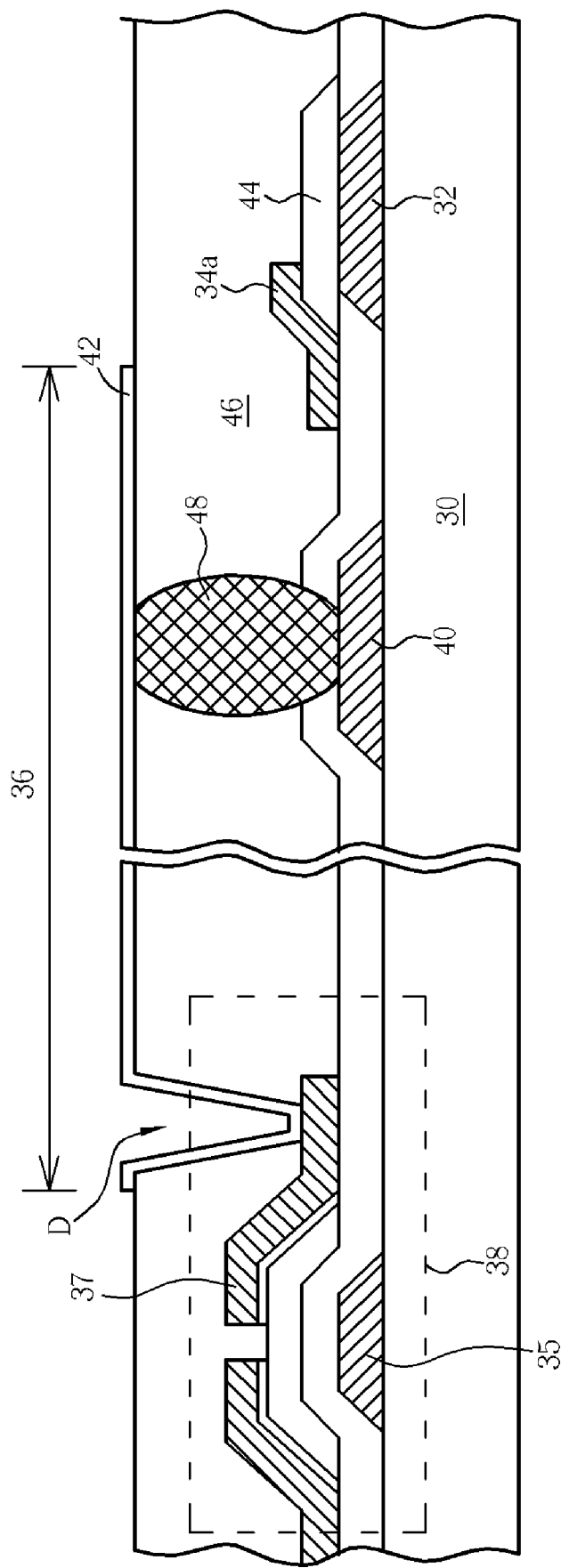
Figure 4B:
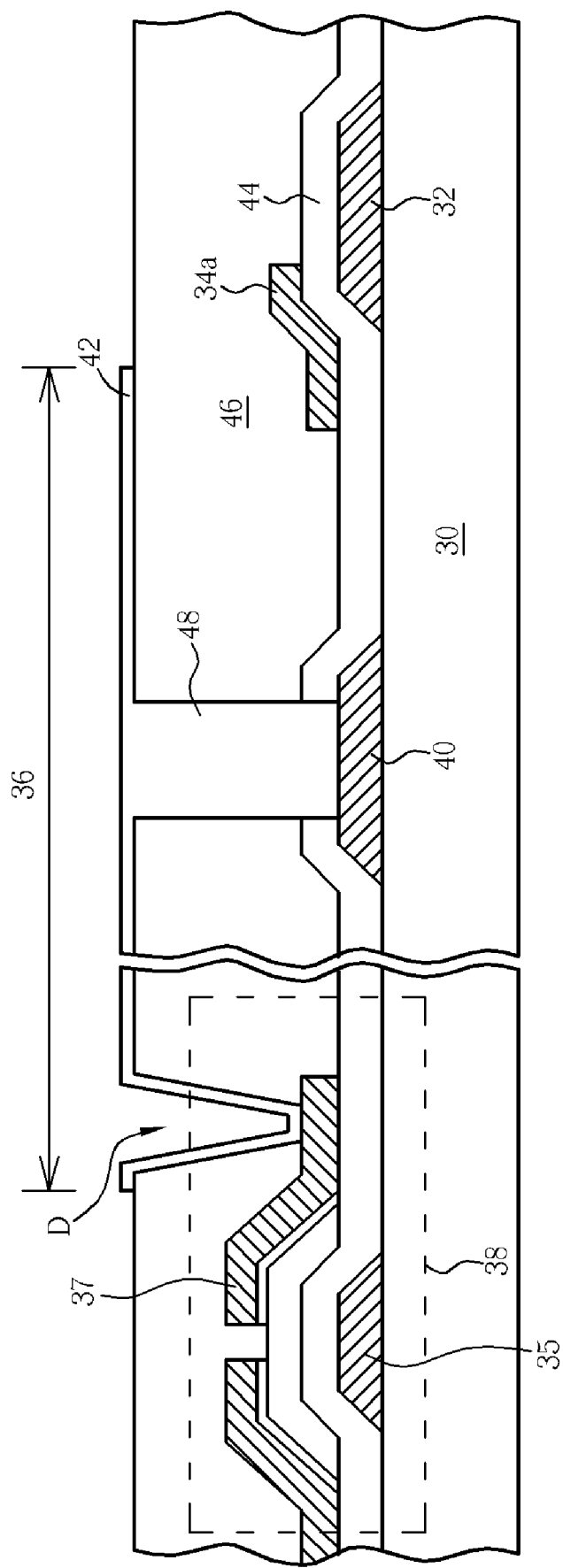
Figure 5:
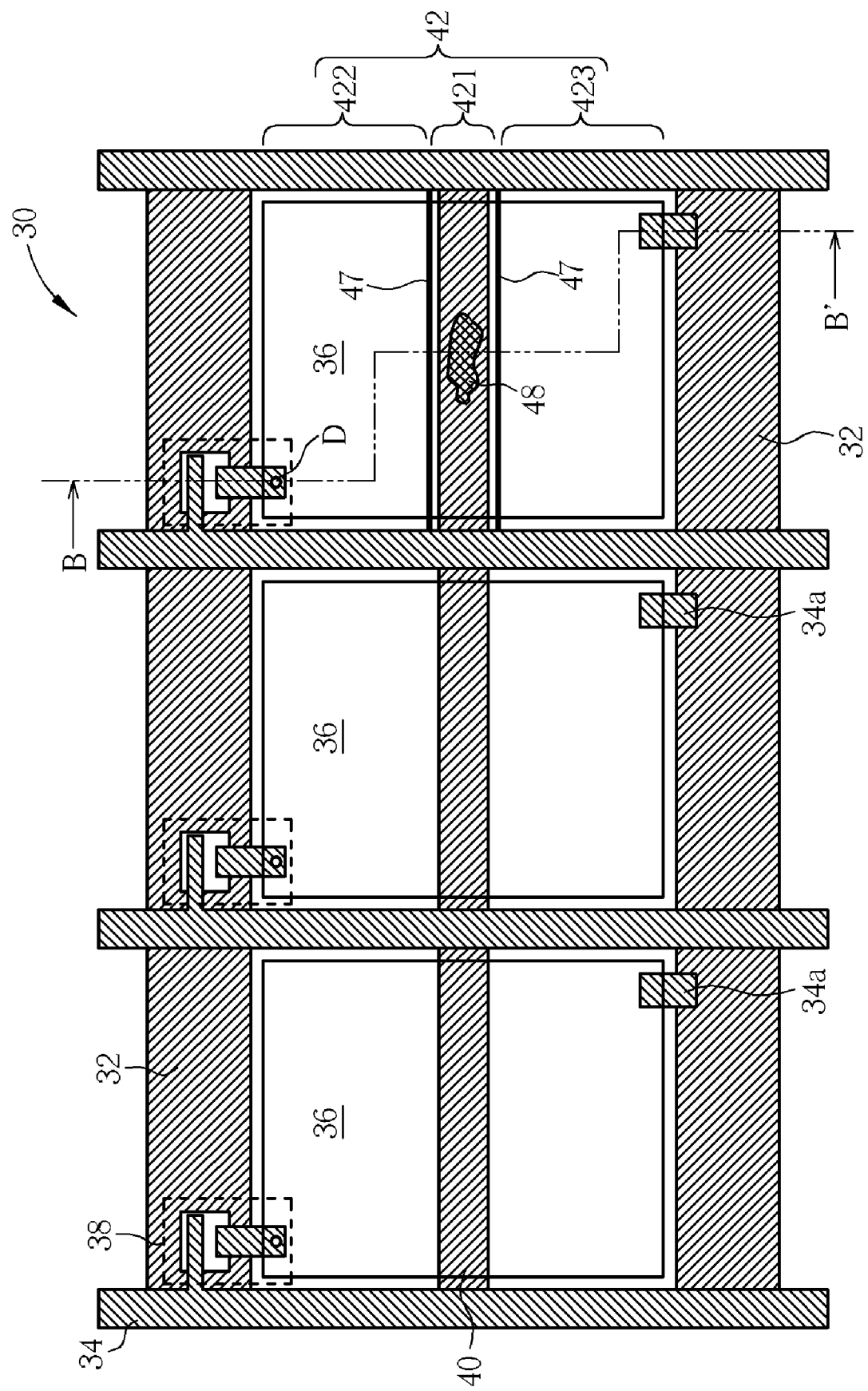
Figure 6:
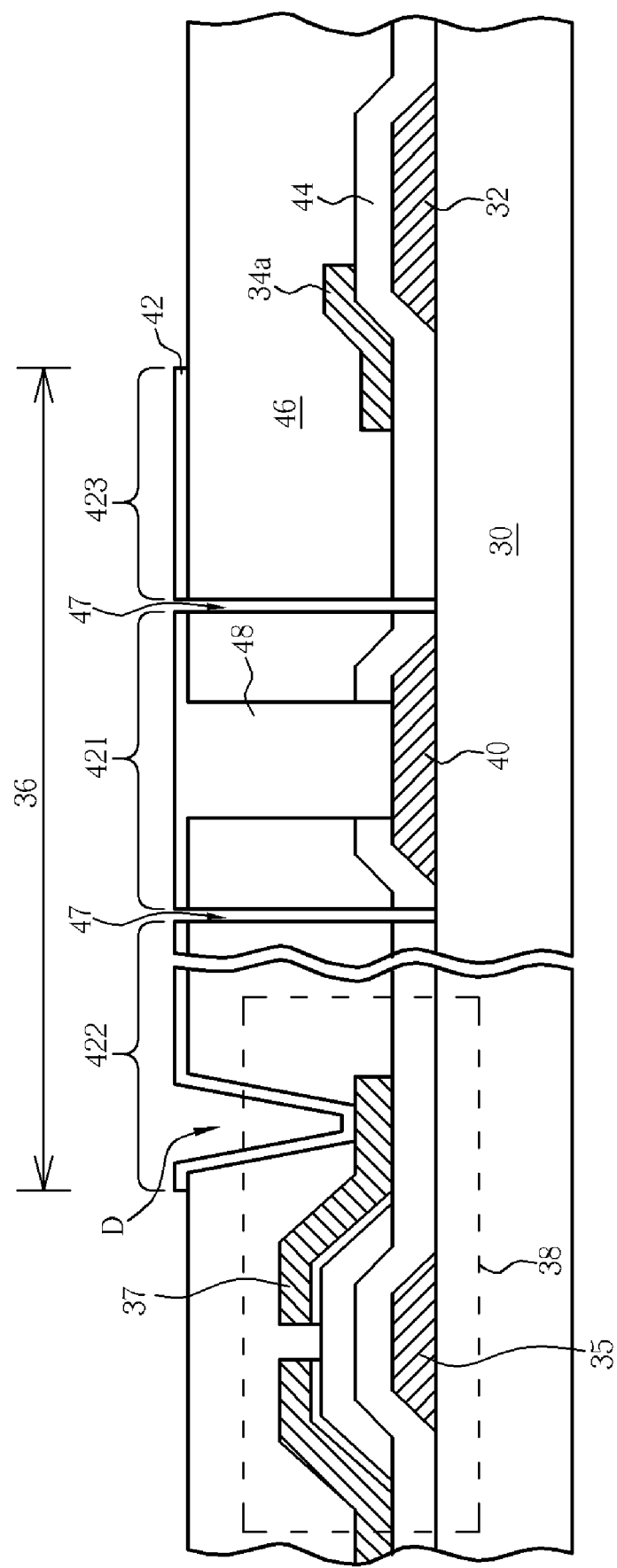
Figure 7:
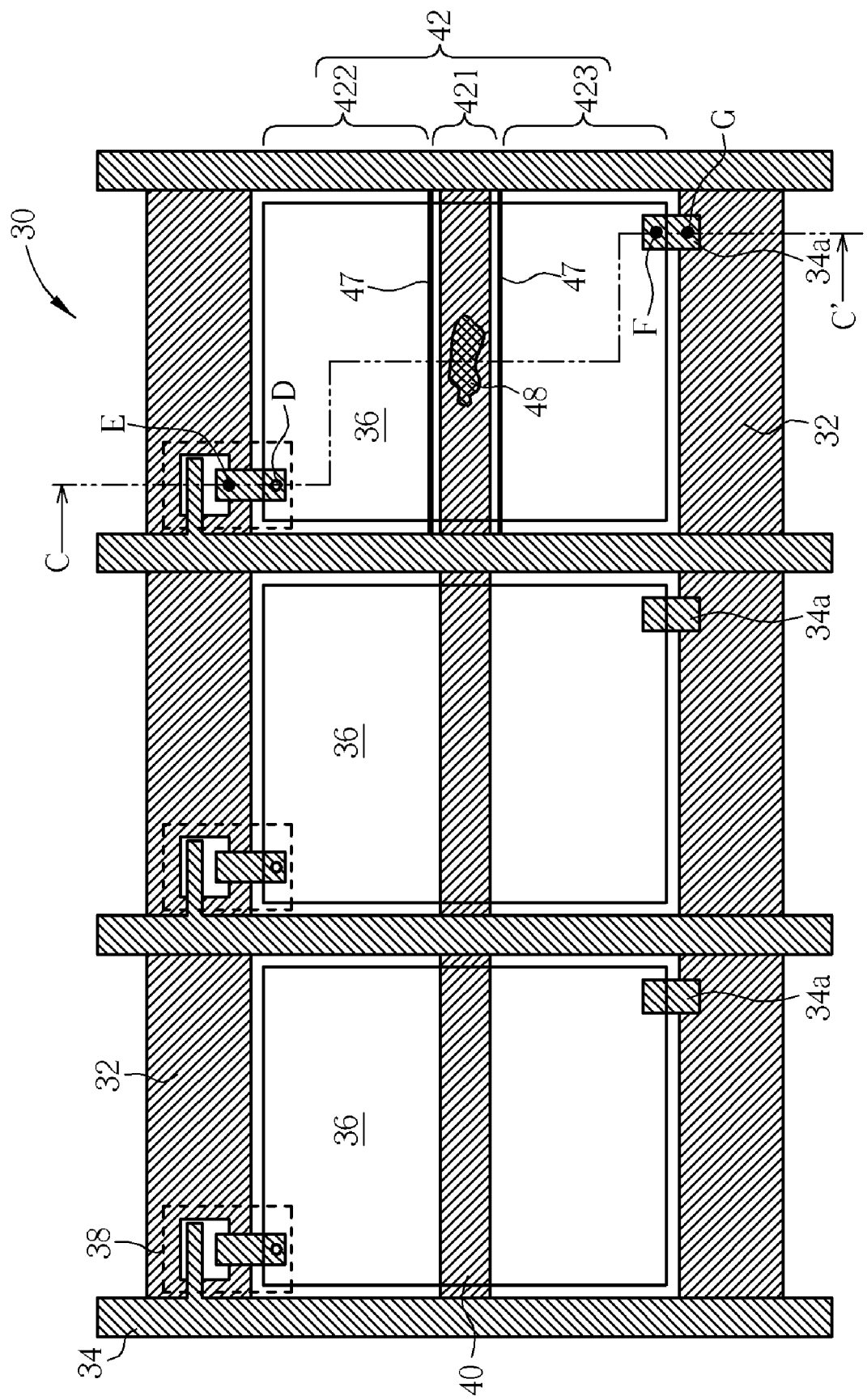
Figure 8:
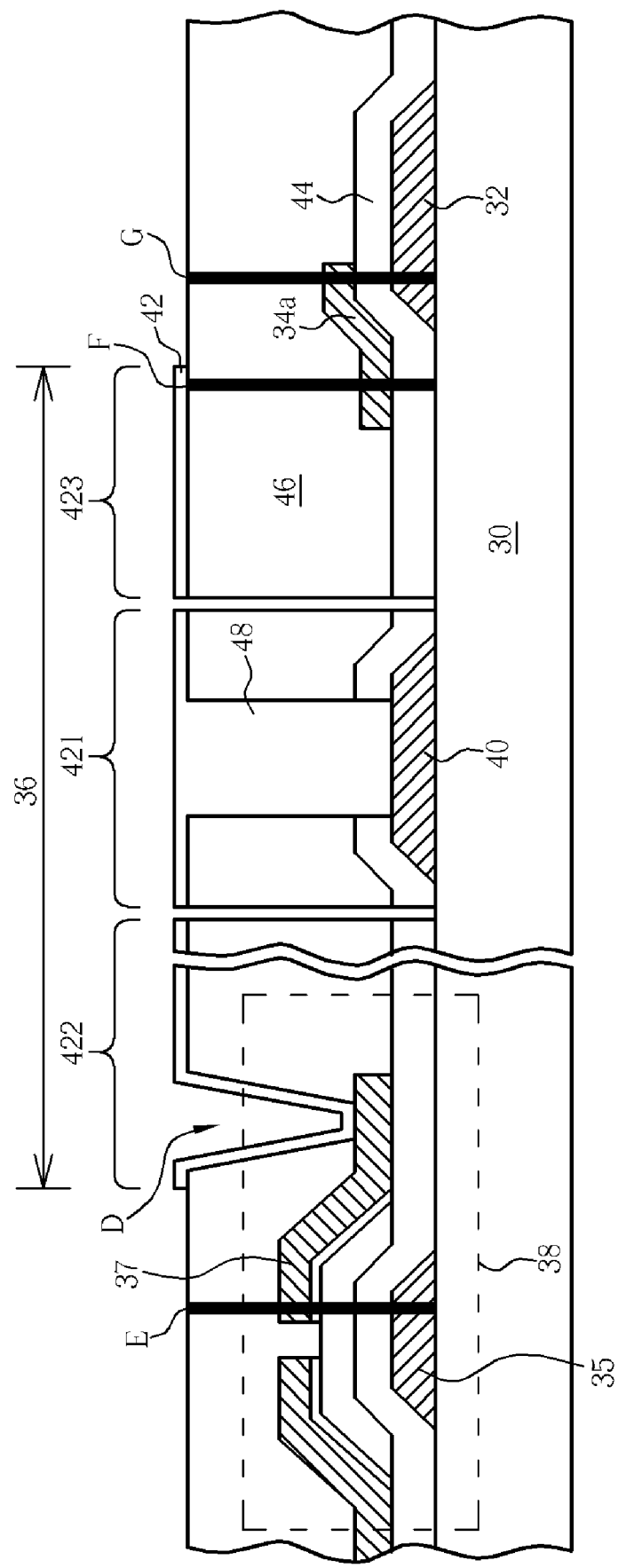

Please refer to FIGS. 3-8. FIGS. 3-8 are schematic diagrams illustrating a method of repairing a defect in an array substrate of an LCD panel in accordance with the first embodiment of the present invention. FIGS. 3, 5 and 7 are top views of the array substrate, FIG. 4 including FIG. 4a and FIG. 4b are cross-sectional views of the array substrate shown in FIG. 3 along a line AA', FIG. 6 is a cross-sectional view of the array substrate shown in FIG. 5 along a line BB', and FIG. 8 is a cross-sectional view of the array substrate shown in FIG. 7 along a line CC'. As shown in FIG. 3 and FIG. 4, an array substrate 30 is provided. The array substrate 30 includes a plurality of scan lines 32 arranged in parallel, a plurality of data lines 34 arranged perpendicular to the scan lines 32 disposed over the array substrate 30, a plurality of pixel regions 36 defined by the scan lines 32 and the data lines 34, a plurality of thin film transistors 38 disposed in each pixel region 36, and a plurality of common lines 40 arranged in alternately with the scan lines 32. The common lines 40 and the scan lines 32 are formed by the same lithography process, and the common lines 40 and the scan lines 32 are normally referred to as metal 1 (M1). The data lines 34 are formed subsequent to the scan lines 32, and the data lines 34 are therefore usually referred to as metal 2 (M2). The array substrate 30 further includes a plurality of pixel electrodes 42 disposed in each pixel region 36, and electrically connected to the source/drain of each thin film transistor 38 via a through hole D. As FIG. 4 shows, the array substrate 30 also has an intermediary layer including a dielectric layer 44 and a passivation layer 46 disposed between the common lines 40 and the pixel electrodes 42. It is noted that the array substrate 30 further includes a connecting bridge 34a (as shown in FIG. 3 and FIG. 4) in each pixel region 36 in case of repairing requirement. The connecting bridge 34a is formed in the M2 layer, and the function of the connecting bridge 34a will be detailed in following description.

This embodiment illustrates a Cst on common type LCD, and thus a portion of each pixel electrode 42 overlaps each of the common line 40 in each pixel region 36 to form a storage capacitor region. In the storage capacitor region, the common line 40 and the pixel electrode 42 respectively serve as a bottom electrode and an upper electrode of the storage capacitor, and the dielectric layer 44 and the passivation layer 46 serve as a capacitor dielectric layer so as to from a storage capacitor in each pixel region 36.

However, in the manufacture process of the array substrate, due to unexpected reasons, defects may occur in the storage capacitor region. As shown in FIG. 3, FIG. 4 and FIG. 5, if a defect 48, such as a particle defect (as shown in FIG. 4a) or a loss of portion of the dielectric layer 44 and a loss of portion of the passivation layer 46 (as shown in FIG. 4b), unexpectedly occurs to the storage capacitor region in one of the pixel region 36, the pixel region 36 will fail. In this embodiment, whether the defect 48 is the particle defect (shown in FIG. 4a) or the loss defect (shown in FIG. 4b), the pixel electrode 42 and the common line 40 are electrically connected, thereby forming a short-circuitry. But it is noted that, the method of the present invention which will be described as following can be not only applied to the situation that the defect 48 must make pixel electrode 42 and common line 40 be short-circuited but also the situation that the defect 48 just makes the storage capacitor malfunction or work non-normally.

Taking the loss defect (shown in FIG. 4b) for example, when the defect 48 is detected, the pixel region 36 having the defect 48 needs to be repaired. As shown in FIGS. 5 and 6, a cutting process is performed along and near the both two sides of the common line (as the cutting lines 47 shown in FIG. 5 and FIG. 6) to divide the pixel electrode 42 having the defect 48 into a first portion 421 substantially corresponding to the common line 40, a second portion 422, and a third portion 423, not connecting to each other. In this embodiment, the cutting process is a laser cutting process, but not limited. In addition, the cutting depth is not limited to the pixel electrode 42, and can be deeper, even can reach the upper surface of the array substrate 30 (as shown in the FIG. 6). To ensure the electrical disconnection of the pixel electrode 42 and the common line 40, the passivation layer 46 or the dielectric layer 44 can be cut along with the pixel electrode 42 in the cutting process. It is appreciated that the cutting line is along both sides of the common line 40, but the cutting line should not be too close to the sides of the common line 40 for preventing the electrical connection between the pixel electrode 42 and the common line 40 through the cutting line.

After the cutting process, the pixel electrode 42 is divided into three portions, and the first portion 421 having the defect 48 is isolated from the second portion 422 and the third portion 423.

Sequentially, as shown in FIGS. 7 and 8, the second portion 422 of the pixel electrode 42 is electrically connected to the gate electrode 35 of the scan lines 32 through welding the source/drain electrode 37 and the gate electrode 35 together at the point E, and the third portion 423 of the pixel electrode 42 is electrically connected to another scan lines 32 through respectively welding the connecting bridge 34a and the pixel electrode 42 together at the point F as well as welding the connecting bridge 34a and the another gate line 32 together at the point G. In this embodiment, the electrical connection between the second portion 422 and the gate electrode 35, and between the third portion 423 and another scan line 32 is achieved by laser welding, but not limited. As shown in FIGS. 7 and 8, the source/drain 37 which electrically contacts with the pixel electrode 42 via the through hole D overlaps the gate electrode 35 of the thin film transistor 38, and thus the source/drain 37 and the gate electrode 35 can be directly welded as shown in FIG. 8. On the other hand, the third portion 423 and another scan line 32 are not overlapping. In such a case, the connecting bridge 34a, which is part of the M2 layer, and interposed between the third portion 423 and the scan line 32, serves as a connecting media between the third portion 423 and the scan line 32 as shown in FIG. 8. Therefore, the third portion 423 can be connected to the scan line 32 by welding through the connecting bridge 34a. Since the second portion 422 and the third portion 423 are respectively connected to the scan lines 32 and are respectively provided a voltage of the scan line 32, voltage differences will respectively exist between the second portion 422 and the common electrode of the CF substrate (not shown) as well as between the third portion 423 and the common electrode. Consequently, the bright dot defect is eliminated while displaying in case the LCD is NW type. It is appreciated that although there is no voltage difference between the first portion 421 and the common electrode, back light will be shaded by the common line 40. Thus, bright dot defect in the first portion 421 will also be eliminated.

Figure 9:
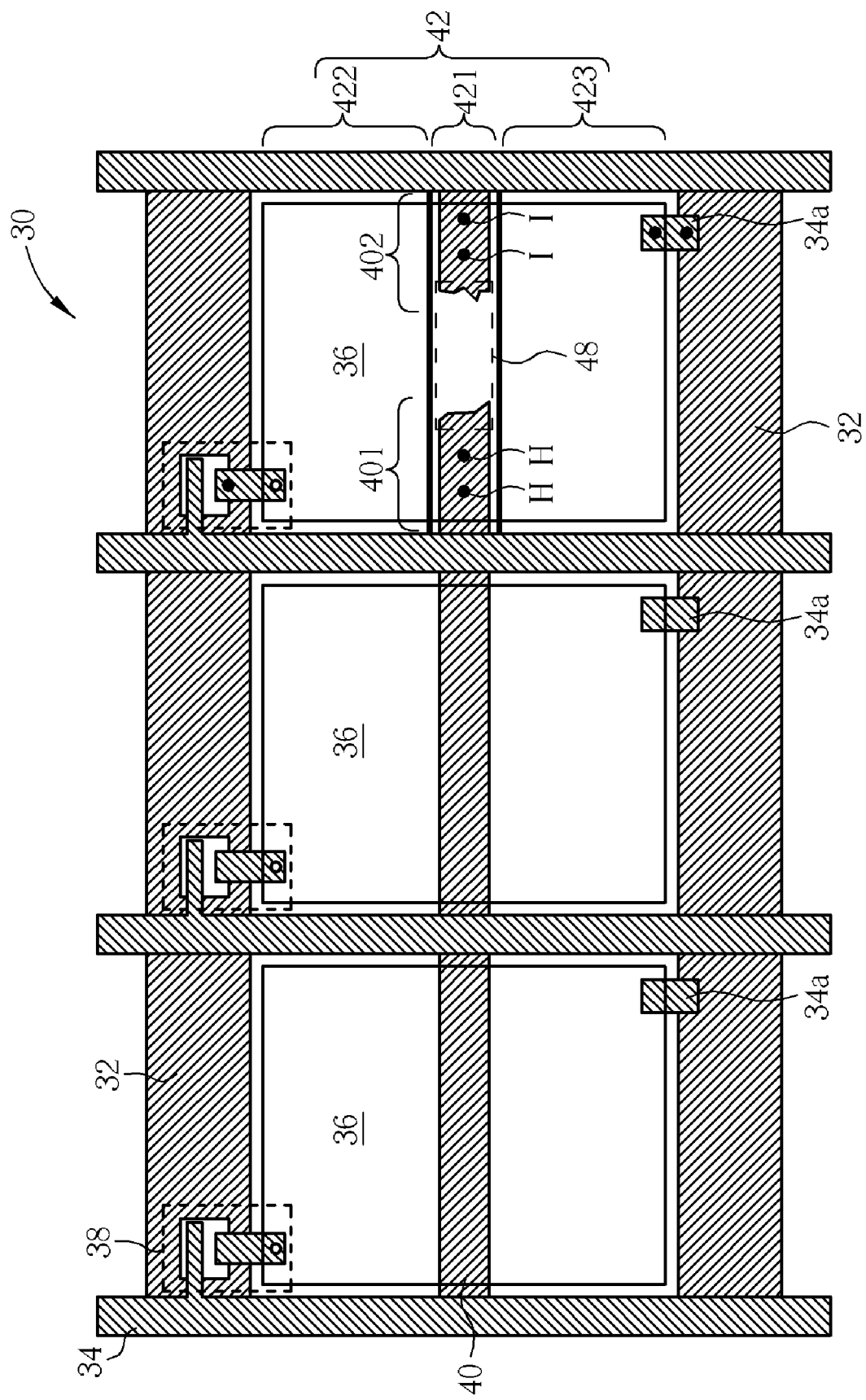
FIG. 9 is a schematic diagram illustrating a method of repairing a defect in an array substrate of an LCD panel in accordance with the second embodiment of the present invention.

Please refer to FIG. 9. FIG. 9 is a schematic diagram illustrating a method of repairing a defect in an array substrate of an LCD panel in accordance with the second embodiment of the present invention. This embodiment also illustrates a Cst on common type LCD similar to the first embodiment, thus like elements are denoted by like numerals, and are not detailed redundantly. As shown in FIG. 9, an array substrate 30 is provided, and a defect 48 unexpectedly appears. Different from the first embodiment is that the defect 48 in the second embodiment is a common line loss or breakage. Usually, a common line loss, as shown in FIG. 9, makes the common line break and have two broken side portions, the first broken side portion 401 and the second broken side portion 402. The common line loss or breakage not only leads to failure of the storage capacitor of the pixel region 36 having the defect 48, but also failure of all the pixel regions 36 using the same common line 40.

Then, a cutting process is then performed to divide the pixel electrode 42 having the defect 48 into a first portion 421 substantially corresponding to the common line 40 and including the defect 48, a second portion 422, and a third portion 423 not connecting to each other. The first portion 421 also has two portions corresponding to and overlapping the two broken side portions 401 and 402 of the common line 40. Subsequently, the second portion 422 is electrically connected to the scan line 32, and the third portion 423 is electrically connected to another scan line 32 through the connecting bridge 34a by laser welding, for instance. In addition, the first portion 421 of the pixel electrode 42 is electrically connected to the broken common line 40 through respectively welding the broken common line 40 and the first portion 421 together at the point H of the first broken side portion 401 and at the point I of the second broken side portion 402.

In this embodiment, the first portion 421 of the pixel electrode 42 is isolated from the second portion 422 and the third portion 423 in the cutting process, and electrically connected to the common line 40 through the laser welding process. The electrical connection of the first portion 421 and the common line 40 enables the first portion 421 to serve as a substitute circuit. Accordingly, the bright dot defect is eliminated by electrically connecting the second portion 422 and the third portion 423 to the corresponding scan lines 32, and the common line loss is repaired by electrically connecting the broken common line 40 with the first portion 421.

Figure 10:
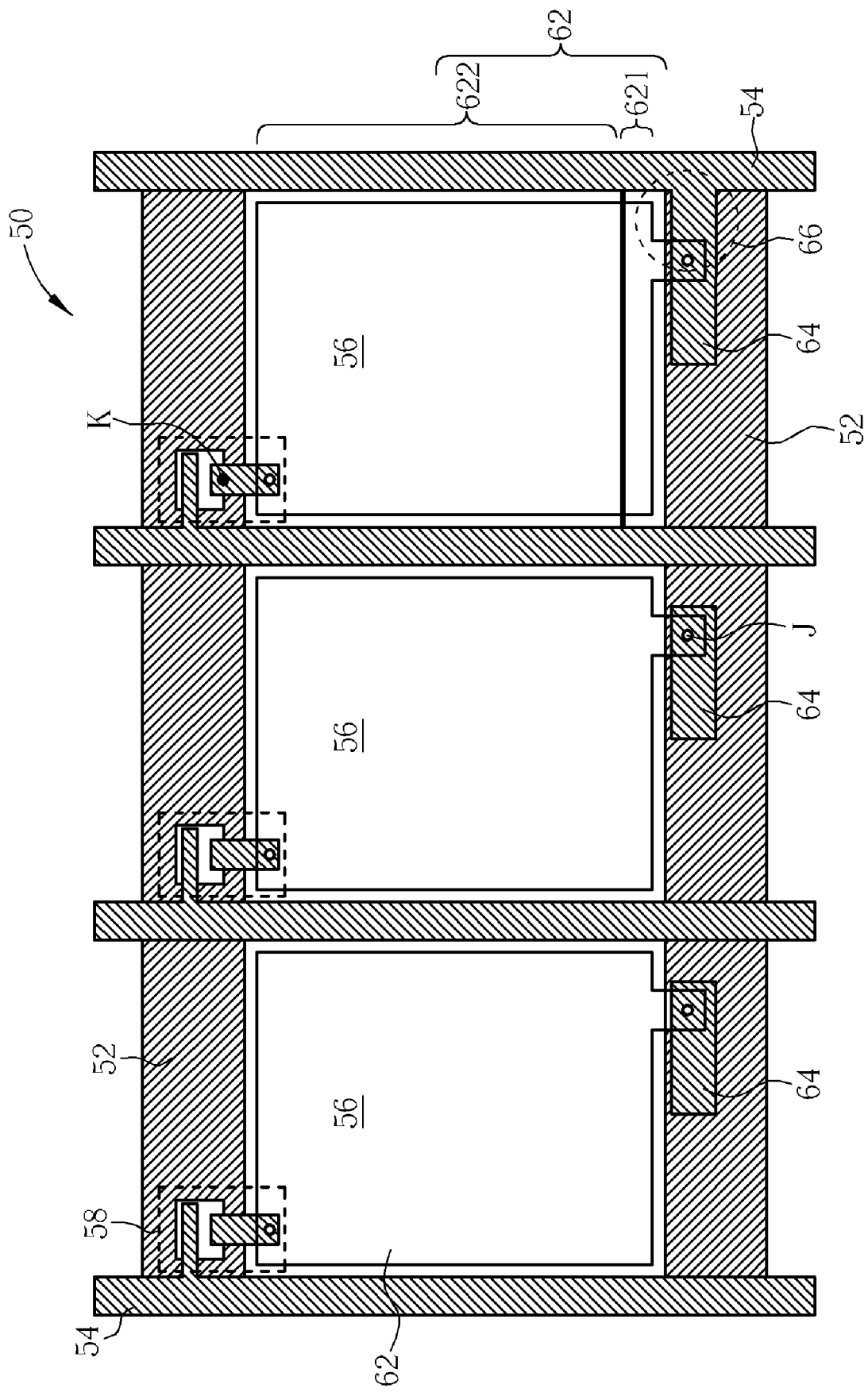
FIG. 10 is a schematic diagram illustrating a method of repairing a defect in an array substrate of an LCD panel in accordance with the third embodiment of the present invention.

Please refer to FIG. 10. FIG. 10 is a schematic diagram illustrating a method of repairing a defect in an array substrate of an LCD panel in accordance with the third embodiment of the present invention. As shown in FIG. 10, the array substrate 50 includes a plurality of scan lines 52 arranged in parallel, a plurality of data lines 54 arranged perpendicular to the scan lines 52 disposed over the array substrate 50, a plurality of pixel regions 56 defined by the scan lines 52 and the data lines 54, a plurality of thin film transistors 58 disposed in each pixel region 56, and a plurality of pixel electrodes 62 disposed in each pixel region 56 and electrically connected to the source/drain of each thin film transistor 58. Different from the above embodiments, this embodiment illustrates a Cst on gate type LCD, and thus an auxiliary electrode 64 which is made of M2 and electrically contacts the pixel electrode 62 via a through hole J and overlaps the scan line 52.

The auxiliary electrode 64 disposed between the pixel electrode 62 and the scan line 52 in each pixel region 56 and is electrically connected to the corresponding pixel electrode 62. Therefore, the pixel electrode 62 and the auxiliary electrode 64 serve as an upper electrode of the storage capacitor, and a portion of the scan line 52 serves as a bottom electrode.

In a normal case, the auxiliary electrode 64 is not electrically connected to the data line 54. However, due to some unexpected factors in the manufacture process of array substrate, the auxiliary electrode 64 and the data line 54 may be short-circuited, thereby forming a defect 66 known as M2 residue as shown in FIG. 10. Since the auxiliary electrode 64 is electrically connected to the pixel electrode 62, the short-circuitry between the auxiliary electrode 64 and the data line 54 will cause failure of the pixel region 56.

In this embodiment, a cutting process e.g. a laser cutting process is performed to divide the pixel electrode 62 into a first portion 621 having the defect 66, and a second portion 622 not connecting to each other. Subsequently, the second portion 622 is electrically connected to the scan line 52 by laser welding at point K, for instance. Since the first portion 621 having the defect 66 is isolated from the second portion 622, and the second portion 622 is electrically connected to the scan line 52, a voltage difference will exist between the second portion 622 of the pixel electrode 62 and the common electrode of the CF substrate (not shown) and the effect of the defect 66 can be eliminated.

Figure 11:
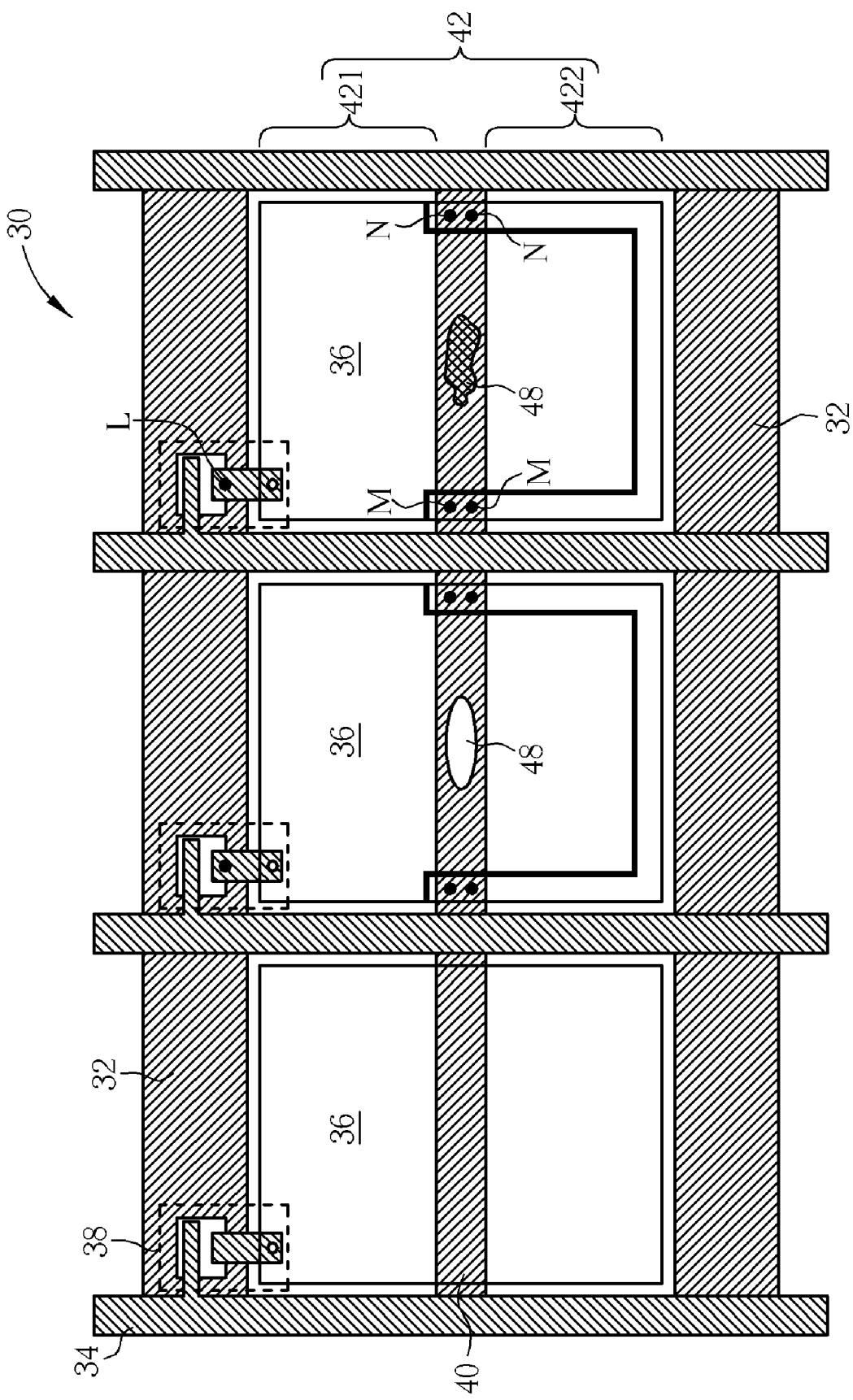
FIG. 11 is a schematic diagram illustrating a method of repairing a defect in an array substrate of an LCD panel in accordance with the fourth embodiment of the present invention.

Please refer to FIG. 11. FIG. 11 is a schematic diagram illustrating a method of repairing a defect in an array substrate of an LCD panel in accordance with the fourth embodiment of the present invention. This embodiment also illustrates a Cst on common type LCD similar to the first embodiment, thus like elements are denoted by like numerals, and are not detailed redundantly. As shown in FIG. 11, an array substrate 30 is provided. The array substrate 30 includes a defect 48 in the storage capacitor region. For instance, as the previous mentioned, the defect 48 may be a dielectric layer loss or a particle that causes a short-circuitry between the pixel electrode 42 and the common line 40. It is appreciated that the array substrate 30 of this embodiment does not include a connecting bridge disposed in each pixel region 36.

Subsequently, a cutting process is performed to divide the pixel electrode 42 having the defect 48 into a first portion 421 including the defect 48, and a second portion 422 which is substantially like a U-shaped structure, not connecting to each other. In the cutting process, please note that the common line 40 is also cut so that one section of the common line 40 having the defect 48 is isolated from other sections of the common line 40.

Following that, the first portion 421 of the pixel electrode 42 is electrically connected to one of the scan lines 32 through welding at a point L, and the second portion 422 of the pixel electrode 42 is electrically connected to the common line 40 corresponding to the second portion 422 through respectively welding at both two sides of the second portion 422 corresponding to the two terminals of the U-shaped structure, such as at the points M and N. In this embodiment, the first portion 421 of the pixel electrode 42, which is isolated from the second portion 422, is electrically connected to the scan line 32 to eliminate the bright dot defect. On the other hand, the second portion 422 is electrically connected to the common line 40 and serves as a substitute circuit of the section of the common line 40 having the defect 48. Consequently, the pixel regions 36 using the same common line 40 can operate normally.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of repairing a defect in a liquid crystal display panel comprising:
   providing an array substrate comprising:
   a plurality of scan lines and data lines disposed over said array substrate and together defining a plurality of pixel regions, and at least one of said pixel regions comprising a transistor, a pixel electrode electrically connected to a source/drain electrode of said transistor, a storage capacitor having an upper electrode and a bottom electrode, wherein said pixel electrode is electrically coupled to said storage capacitor; and
   a defect positioned in said storage capacitor;
   performing a cutting process to divide said pixel electrode into a first portion and a second portion not connecting to each other, wherein said first portion of said pixel electrode is corresponding to said storage capacitor having said defect; and
   electrically connecting said second portion of said pixel electrode to one of said scan lines.

2. The method of claim 1, wherein each said bottom electrode is a portion of one of said scan lines and said upper electrode is electrically coupled to said pixel electrode.

3. The method of claim 2, wherein each said upper electrode is made of a material which is the same as that of said data line.

4. The method of claim 3, wherein said defect is a metal residue which makes said upper electrode electrically connect to one of said data lines.

5. The method of claim 1, wherein said array substrate further comprises a plurality of common lines and each said bottom electrode is a portion of one of said common lines and each said upper electrode is a portion of said pixel electrode.

6. The method of claim 5, wherein said defect is a common line loss in one of said common lines.

7. The method of claim 6, wherein said cutting process further comprises dividing the pixel electrode into a third portion not connecting to the first portion or the second portion, and electrically connecting said third portion to another said scan line, and electrically connecting said first portion to said one of said common lines having said common line loss.

8. The method of claim 7, wherein said pixel region further comprises a connecting bridge, and the step of connecting said third portion to said another said scan line is performed through electrically connecting said third portion to said connecting bridge and connecting said connecting bridge to said another said scan line.

9. The method of claim 7, wherein said one of said common line has two broken side portions, the first broken side portion and the second broken side portion and the step of connecting said first portion to said one of said common lines is performed through respectively welding said one of said common line and said first portion together at the first broken side portion and at the second broken side portion.

10. The method of claim 5, wherein said cutting process further comprises dividing said pixel electrode into a third portion not connecting to said first portion and said second portion, and electrically connecting said third portion to another said scan line.

11. The method of claim 10, wherein said cutting process is performed through cutting said pixel electrode along both two sides of said common line to divide said pixel electrode into said first portion, said second portion and said third portion.

12. The method of claim 10, wherein said pixel region further comprises a connecting bridge, and the step of connecting said third portion to said another said scan line is performed through electrically connecting said third portion to said connecting bridge and connecting said connecting bridge to said another said scan line.

13. The method of claim 10, wherein the step of electrically connecting said third portion to another said scan line is performed by laser welding.

14. The method of claim 1, wherein said storage capacitor further comprises an intermediary layer interposed between said upper electrode and said bottom electrode, and said defect is a particle in said intermediary or a loss of said intermediary layer.

15. The method of claim 14, wherein said defect leads to a short circuitry between said upper electrode and said bottom electrode.

16. The method of claim 14, wherein said intermediary layer is cut along with said pixel electrode in said cutting process.

17. The method of claim 14, wherein said intermediary layer comprises a passivation layer and a dielectric layer.

18. The method of claim 17, wherein said passivation layer is cut along with said pixel electrode in said cutting process.

19. The method of claim 17, wherein said dielectric layer is cut along with said pixel electrode and said passivation layer in said cutting process.

20. The method of claim 1, wherein said cutting process is a laser cutting process.

21. The method of claim 1, wherein the step of connecting said second portion of said pixel electrode to one of said scan lines is performed by laser welding.

22. The method of claim 1, wherein the step of connecting said second portion of said pixel electrode to one of said scan lines is performed through electrically connecting the source/drain electrode and said one of said scan lines by welding.

23. A liquid crystal display panel, comprising:
an array substrate;
a plurality of scan lines and data lines disposed over said array substrate and together defining a plurality of pixel regions, and at least one of said pixel regions comprising a transistor, a pixel electrode electrically connected to a source/drain electrode of said transistor, a storage capacitor having an upper electrode and a bottom electrode, wherein said pixel electrode is electrically coupled to said storage capacitor; and
a defect positioned in said storage capacitor;
wherein said pixel electrode comprises a first portion which is corresponding to said storage capacitor including said defect, and a second portion not connecting to each other; and
wherein said second portion of said pixel electrode is electrically connected to one of said scan lines.

24. The liquid crystal display panel of claim 23, wherein each of said bottom electrode is a portion of one of said scan lines and said upper electrode is coupled to said pixel electrode.

25. The liquid crystal display panel of claim 24, wherein said upper electrode is made of a material which is the same as that of said data line.

26. The liquid crystal display panel of claim 25, wherein said defect is a metal residue which makes said upper electrode electrically connect to one of said data lines.

27. The liquid crystal display panel of claim 23, wherein said array substrate further comprises a plurality of common lines and each said bottom electrode is a portion of one of said common lines and each said upper electrode is a portion of said pixel electrode.

28. The liquid crystal display panel of claim 27, wherein said defect is a common line loss in one of said common lines.

29. The liquid crystal display panel of claim 28, wherein said pixel electrode further comprises a third portion not connecting to said first portion and said second portion, and said third portion is electrically connected to another said scan line, and said first portion is electrically connected to said one of said common lines.

30. The liquid crystal display panel of claim 27, wherein said pixel electrode further comprises a third portion not connecting to said first portion and said second portion, and said third portion is electrically connected to another said scan line.

31. The liquid crystal display panel of claim 27, wherein said pixel region further comprises a connecting bridge, and the connection of said third portion and said another said scan line is via an electrical connection between said third portion and said connecting bridge and an electrical connection between said connecting bridge and said another said scan line.

32. The liquid crystal display panel of claim 23, wherein said storage capacitor further comprises an intermediary layer interposed between said upper electrode and said bottom electrode, and said defect is a particle in said intermediary or a loss of said intermediary layer.

33. The liquid crystal display panel of claim 32, wherein said defect leads to a short circuitry between said upper electrode and said bottom electrode.

34. The liquid crystal display panel of claim 23, wherein the electrical connection between said second portion and said one of said scan lines is via an electrical connection between the source/drain and said one of said scan lines.

* * * * *